United States Patent [19]
Lee et al.

[11] Patent Number: 4,919,215
[45] Date of Patent: Apr. 24, 1990

[54] HITCH WITH ANTI-SWAY LINK

[75] Inventors: Michael C. Lee, Beaver Dam; Dale R. Dobberpuhl, Horicon, both of Wis.

[73] Assignee: Deere & Company, Moline, Ill.

[21] Appl. No.: 327,282

[22] Filed: Mar. 22, 1989

[51] Int. Cl.⁵ .................... A01B 59/041; A01D 34/24
[52] U.S. Cl. ...................................... 172/450; 56/15.9
[58] Field of Search .............. 172/450, 439, 445, 446; 56/14.9, 15.9

[56] References Cited

U.S. PATENT DOCUMENTS

| | | | |
|---|---|---|---|
| 2,698,564 | 1/1955 | Sawyer | 97/47.66 |
| 2,727,756 | 12/1955 | Carlile | 172/450 X |
| 2,775,180 | 12/1956 | Shane | 172/450 X |
| 3,207,529 | 9/1965 | Harper | 280/460 |
| 3,627,060 | 12/1971 | Lemmon | 172/450 |
| 4,203,613 | 5/1980 | Kunze | 172/450 |
| 4,216,975 | 8/1980 | Schafer | 280/461 A |
| 4,236,724 | 12/1980 | Schillings | 280/460 A |
| 4,265,464 | 5/1981 | Lange | 172/450 |
| 4,397,359 | 8/1983 | Price et al. | 172/430 |
| 4,779,406 | 10/1988 | Schroeder | 56/15.9 |

FOREIGN PATENT DOCUMENTS

| | | | |
|---|---|---|---|
| 549081 | 11/1957 | Canada | 172/450 |
| 1955809 | 11/1978 | Fed. Rep. of Germany | 172/450 |
| 195739 | 7/1967 | U.S.S.R. | 172/450 |

OTHER PUBLICATIONS

"Sure-Line Implement Stabiliser", Farm Implement and Machinery Review, p. 1286, Nov. 1, 1955.
Excel Hustler brochure for Models 275, 295 and 305D Mowers.

Primary Examiner—Randolph A. Reese
Assistant Examiner—Jeffrey L. Thompson

[57] ABSTRACT

Lateral sway of vertically movable hitch arms is prevented by an anti-sway link which has one end pivotally mounting one of a pair of lift arms and its opposite rigidly attached to the other of the pair of lift arms.

3 Claims, 2 Drawing Sheets

HITCH WITH ANTI-SWAY LINK

FIELD OF THE INVENTION

This invention relates generally to lift structure for attaching implements to vehicles and is more particularly concerned with such a lift structure which includes an anti-sway link.

BACKGROUND OF THE INVENTION

Front-mounted mowers typically have a pair of arms which are pivotally connected to a vehicle, extend forwardly therefrom and have their forward ends connected to a mower deck, either directly or indirectly. Generally the arms are pivoted to the vehicle so that the mower deck can float vertically relative to the vehicle and, in some cases, so the arms can be used to raise and lower the mower deck in much the same manner as a front or rear power hitch on an agricultural or lawn and garden tractor.

In order to have front-mounted mowers steer and track properly, it is necessary to prevent lateral movement of the forwardly extending arms relative to the tractor. In the past lateral movement has been prevented through the use of rather bulky bushings mounting the arms on the vehicle, but this solution has not proved entirely satisfactory and has been rather costly. Attempts have been made to form the arms integral with a pivot tube, but this has prevented independent movement between the two arms as may be necessary for proper mower float and has also been expensive.

In agricultural and lawn and garden tractors lateral sway of the draft or push links is limited by sway bars which are attached to the draft or push links at a point intermediate their ends and extend away from such attachment point to another attachment point on the tractor. The disadvantage with such lateral sway limiting links has been that they operated through such a small angle relative to the draft or push link that very little of the resistive force they provided actually worked against side force causing the lateral sway.

SUMMARY OF THE INVENTION

The object of the present invention is to provide a very simple and effective anti-sway link for implement mounting arms, which anti-sway link operates through a relatively large angle so that the resistance it provides is almost in direct opposition to the sway force.

Another object of the present invention is to provide hitch linkage which includes an anti-sway link which serves as the pivot pin for one arm of the hitch linkage and acts in almost direct opposition to lateral forces acting on the opposite arm of the draft linkage.

The above and additional objects and advantages of the present invention will become apparent to those skilled in the art from a reading of the following detailed description of the preferred embodiment of the invention when taken in conjunction with the accompanying drawings.

DESCRIPTION OF THE PREFERRED EMBODIMENT

Figure 1:
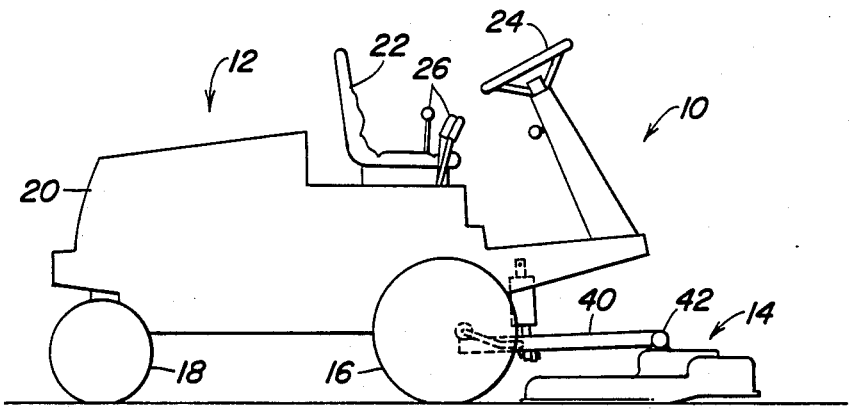
FIG. 1 is a side view of a front mower having a hitch with the anti-sway link according to the present invention.
Figure 2:
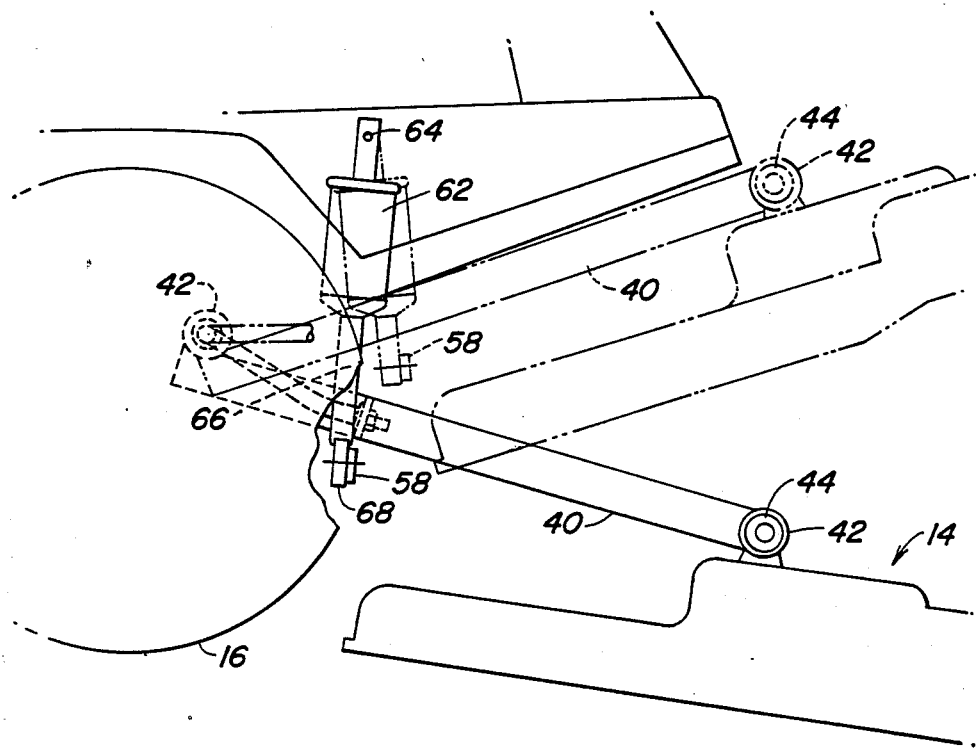
FIG. 2 is an enlarged view of the hitch illustrated in FIG. 1.

Referring now to the drawings, a front mower is indicated generally by the reference numeral 10 and includes a vehicle 12 and mower 14. The vehicle is supported on a pair of front, driven wheels 16 and at least one steerable rear wheel 18. The vehicle 12 further includes a rear engine compartment 20 and a forward operator's station which includes a seat 22, steering wheel 24 and various controls 26 positioned adjacent the seat 22. The forward wheels 16 are mounted at the outer ends of axles housed within a transverse differential/axle housing 28.

Figure 3:
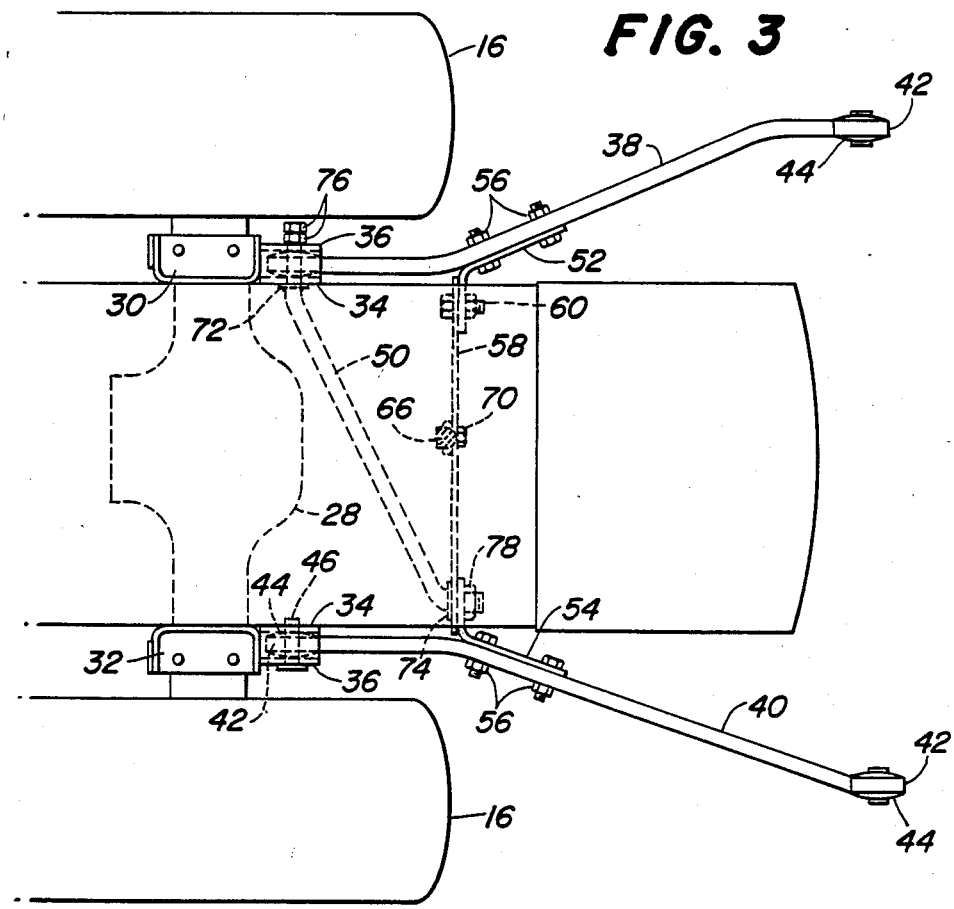
FIG. 3 is a top plan view of the hitch illustrated in FIG. 1.
Figure 4:
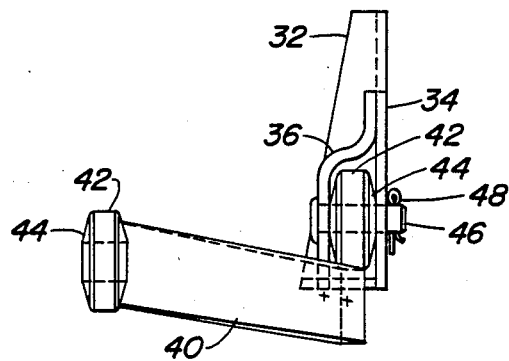
FIG. 4 is an end view of one hitch arm and the brackets which mount the arm.

As can be seen in FIG. 3, a pair of chassis mounting brackets 30 and 32 are secured to the opposite ends of the differential/axle housing 28, and these brackets serve to mount the chassis of the vehicle 12 on the forward wheels. Secured to a forward facing portion of each of the brackets 30 and 32 is a pair of inner and outer ears 34 and 36, respectively, which form a hitch arm mounting bracket. The ear 34 extends generally vertically and the lower end of the ear 36 is spaced from and extends generally parallel to the ear 34. The upper portion of the ear 36 extends over to the ear 34 where the two ears are joined together for rigidity. The hitch arm mounting brackets formed by the ears 34 and 36 are positioned equal distances from the longitudinal center line of the vehicle and are apertured with the centers of the apertures lying on a common axis transverse to the longitudinal center line of the vehicle.

Left and right hitch arms 38 and 40 have their rear ends pivotally connected between the ears 34 and 36 on the left and right side of the vehicle and extend generally forwardly and laterally outwardly therefrom. Secured to each end of each of the hitch arms 38 and 40 in any suitable manner such as welding is a ball and socket joint which includes a socket member 42 and a ball 44 freely articulated in the socket member. Each ball is apertured for receipt of a suitable pin. The ball and socket joint on the rear end of the right arm 40 is positioned between the ears 34 and 36 on the right side of the vehicle and secured therebetween by a pin 46 which extends through the apertured ears and through the opening in the ball. The pin 46 is held in position by any suitable retaining means such as a cotter key 48. This mounting of the right hitch arm 40 to the vehicle permits the right hitch arm 40 to freely pivot vertically and also to have limited lateral pivotal movement. The rear end of the left hitch arm 38 is similarly mounted between the ears 34 and 36 on the left side of the vehicle, but in this instance the pivot pin is replaced by the left end of an anti-sway link 50 which will be more fully described hereinafter. At their forward ends the hitch arms 38 and 40 are pivotally connected to the mower indicated generally at 14.

Brackets 52 and 54 are mounted on the left and right lift arms 38 and 40, respectively, intermediate their ends by bolts 56. A free end of each of the brackets 52 and 54 is turned in and extends towards the opposite hitch arm. A tie or lift bar 58 extends between the free ends of the brackets 52 and 54 and is secured to the brackets 52 and 54 by bolts 60. A hydraulic cylinder 62 has its anchor end pivotally connected to the chassis of the vehicle as at 64. The rod 66 of the hydraulic cylinder 62 has a ball and socket joint 68 at its free end and is connected to the tie/lift bar 58 by a bolt 70 which extends through both the ball and socket joint 68 and the tie/lift bar 58.

The anti-sway link 50 is in the form of a rod with threaded ends and has stop collars 72 and 74 secured thereto adjacent the left and right ends, respectively, as by welding or the like. The left end of the anti-sway link extends through the apertures provided in the ears 34 and 36 on the left-hand side of the vehicle so that the collar 72 abuts against the ear 34. A pair of lock nuts 76 hold the collar 72 snugly against the ear 34, but are sufficiently loose to permit rotation of the link 50 within the ears 34 and 36. Near the collar 72 the anti-sway link or rod 50 has a bend so that the rod extends laterally towards the opposite link and slightly forwardly. Near its right end the anti-sway link or rod 50 has another bend so that the extreme right end extends generally parallel to the longitudinal center line of the tractor. The right end of the rod 50 extends through an aperture in the bracket 54 so that the collar 74 abuts against the bracket. A nut 78 on the threaded end of the rod 50 locks the rod 50 to the link 54.

In operation, retraction of the rod 66 with the hydraulic cylinder 62 through suitable manipulation of one of the controls 26 will act through the lift bar 58 and brackets 52 and 54 to raise the arms 38 and 40 and hence the mower 14. As the arms 38 and 40 are pivoted upwardly about the common axis formed by the pivot pin 46 and the left end of the tie rod 50, the tie rod 50 also pivots about the common axis. Lateral movement of the arm 40 is prevented by the anti-sway link or rod 50 and lateral movement of the arm 38 is prevented by the interconnection between the arms 38 and 40 through the tie/lift bar 58 and the mower 14. As can be seen in FIG. 3, the rod 50 forms a relatively steep angle with the arm 40 and therefore, will exert a force on the arm 40 which acts closely in direct opposition to lateral forces which may be imposed upon the arms 38 and 40. By having the anti-sway rod 50 serve as the pivot pin for the arm 38, the hitch assembly is simplified and manufacturing costs kept at a minimum.

Having described a preferred embodiment of the invention, various changes and modifications within the spirit and scope of the invention will be apparent to those skilled in the art and can be made without departing from the underlying principles of the invention. For example, although the invention is illustrated in conjunction with a front-mounted mower in which the hitch arms push the implement, the same principles can be applied to a tractor in which the hitch arms pull the implement. Therefore, the invention should not be limited to the specifically illustrated and described embodiment, but should be limited only by the following claims.

We claim:

1. Lift structure for connecting an implement to a vehicle including first and second mounting arms having first ends pivotally connected to the vehicle at transversely spaced locations for vertical movement about a common axis and second ends for connection to an implement, power means acting between the vehicle and mounting arms for vertically moving the mounting arms about the common axis, and an anti-sway linkage for limiting lateral swinging movement of the mounting arms, characterized in that the anti-sway linkage is a single, one-piece, rigid link having one end secured to the first mounting arm at a location spaced from the pivotal connection between the vehicle and first mounting arm and a second end pivotally connected to the vehicle at a location closer to the location of the pivotal connection between the vehicle and second mounting arm than the location of the pivotal connection between the vehicle and first mounting arm, a portion of the single rigid link has a substantially circular cross section and extends along and moves about the common axis as the first mounting arm is moved vertically about the common axis.

2. The lift structure set forth in claim 1 wherein the first end of the second mounting arm is pivotally mounted on the portion of circular cross section of the single rigid link.

3. Lift structure for connecting an implement to a vehicle comprising:
    first and second mounting brackets on the vehicle at spaced locations on opposite sides of the vehicle fore-and-aft center line;
    first and second mounting arms each having a first end with a ball and socket joint secured thereto and second ends for connection with an implement;
    means pivotally mounting the ball and socket joints of the first and second mounting arms on the first and second brackets, respectively, for vertical pivotal movement of the mounting arms about a common axis and lateral pivotal movement of the mounting arms about any of a plurality of independent axes; and
    a rigid anti-sway link having one end rigidly secured to the first mounting link intermediate its ends and a second end secured to the vehicle for rotation on the common axis and on the side of the tractor center line opposite from the first mounting arm, and the ball and socket joint of the second mounting arm is mounted on the anti-sway link adjacent the second end thereof.

* * * * *